Jan. 1, 1935.  C. C. FARMER  1,986,469
FLUID PRESSURE BRAKE
Filed Oct. 8, 1931   3 Sheets-Sheet 3
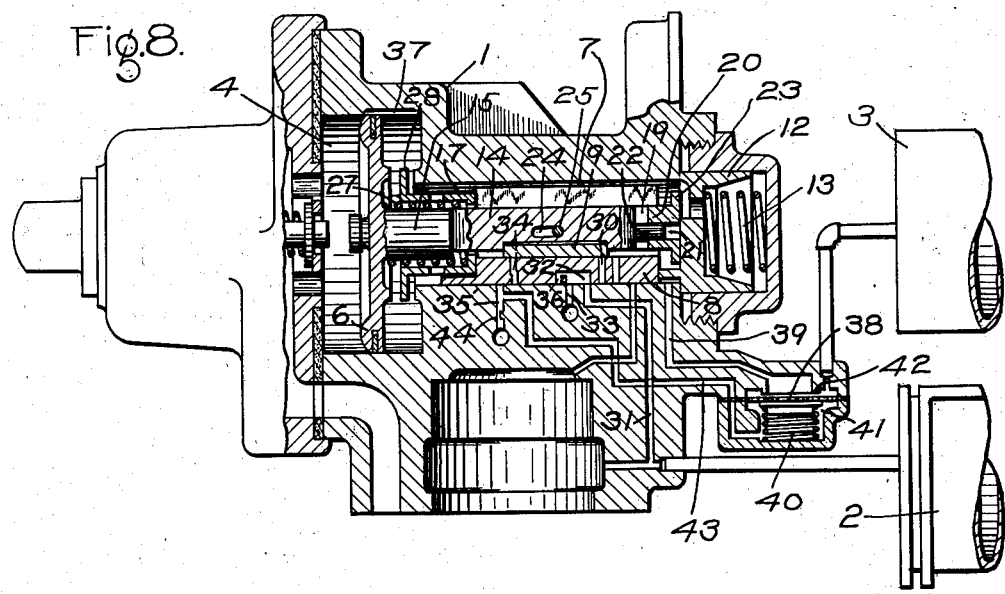
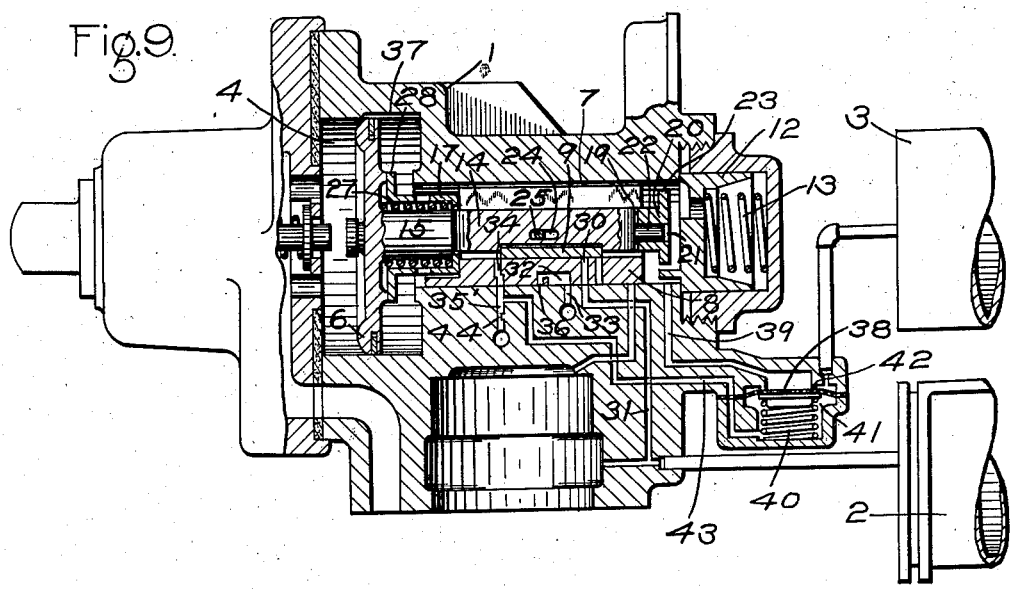
INVENTOR.
CLYDE C. FARMER.
By *Wm. H. Cady*
ATTORNEY.

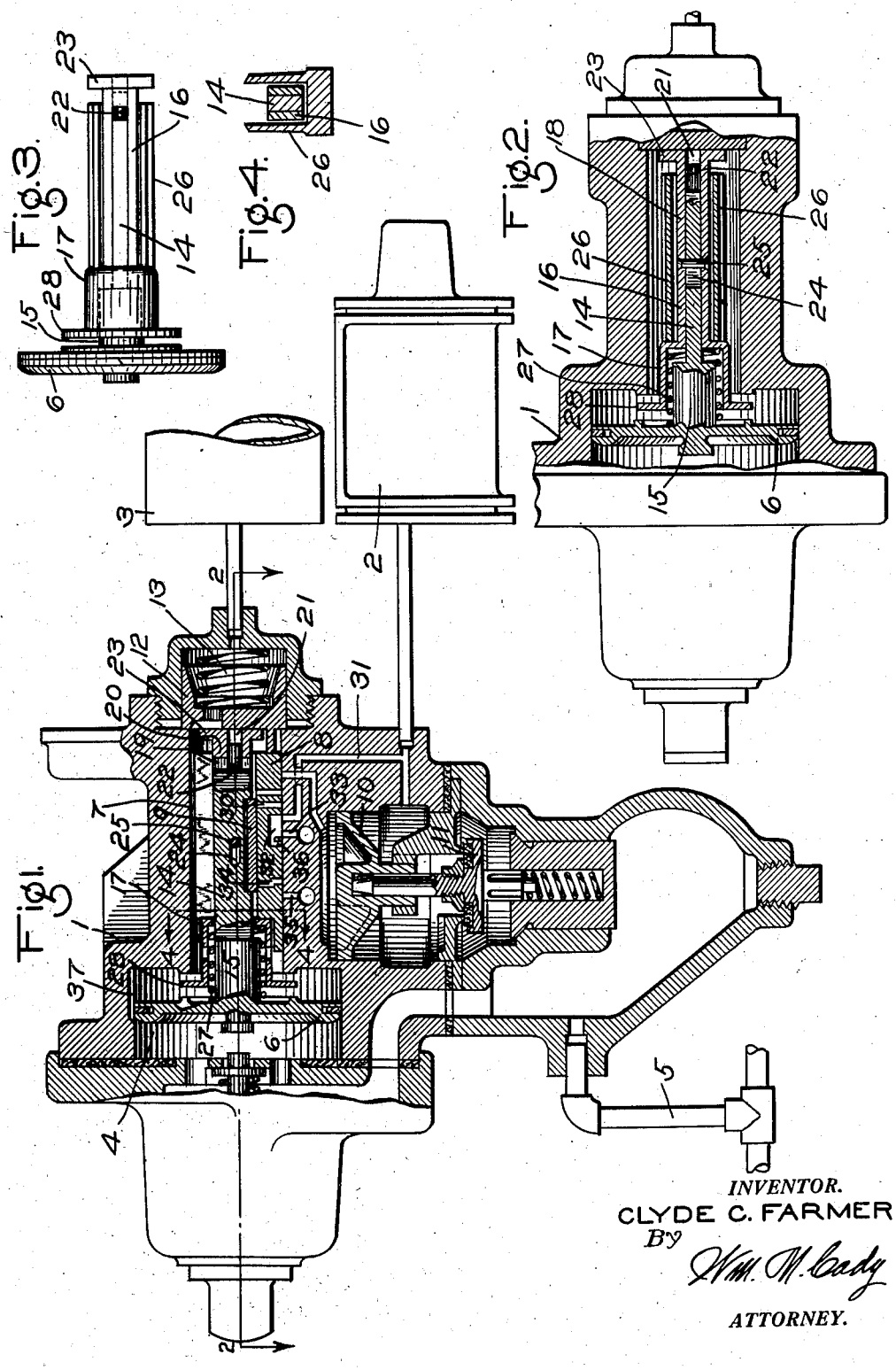

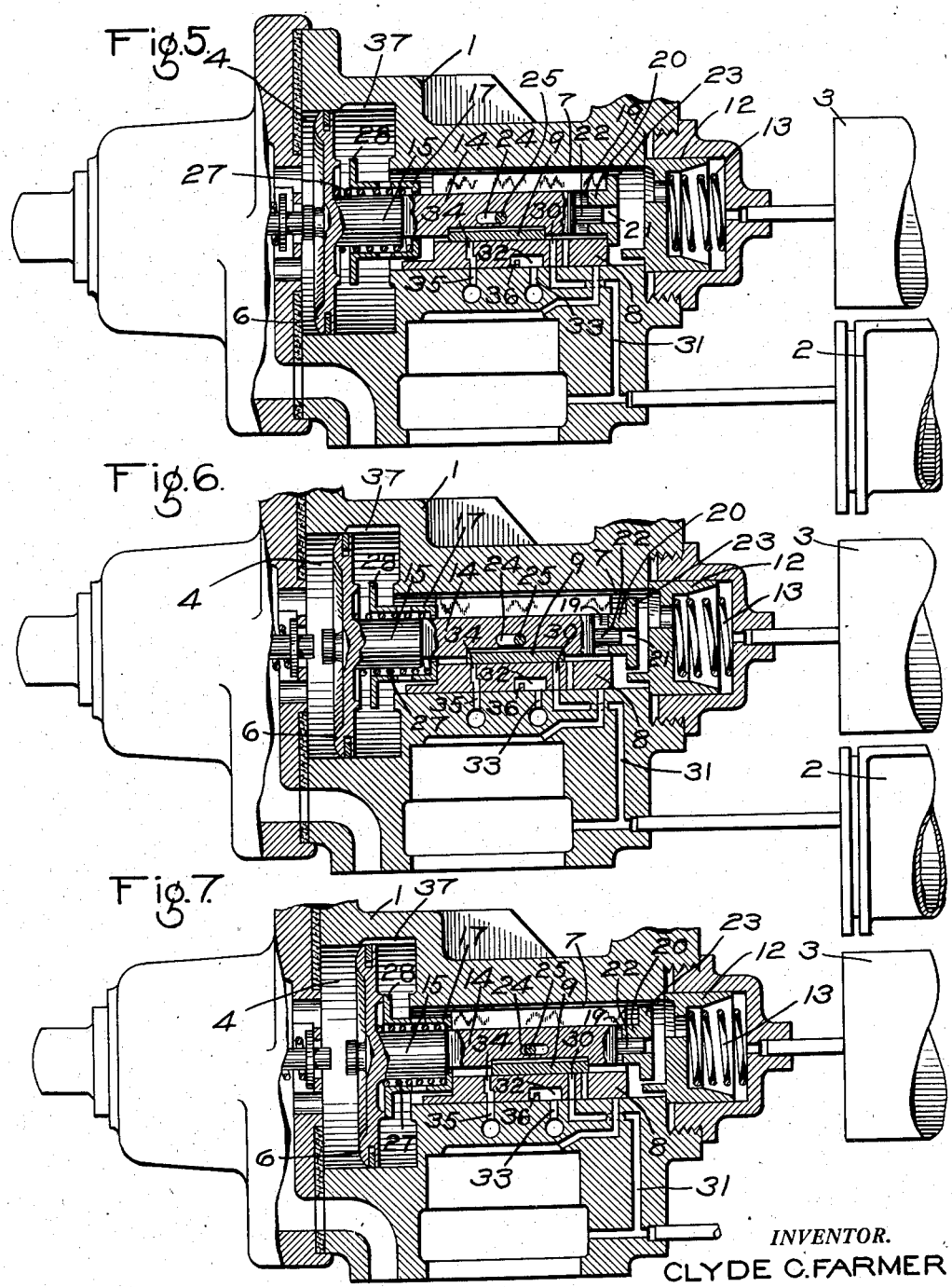

Patented Jan. 1, 1935

1,986,469

UNITED STATES PATENT OFFICE 1,986,469

FLUID PRESSURE BRAKE

Clyde C. Farmer, Pittsburgh, Pa., assignor to The Westinghouse Air Brake Company, Wilmerding, Pa., a corporation of Pennsylvania Application October 8, 1931, Serial No. 567,601

9 Claims. (Cl. 303—70)

This invention relates to fluid pressure brakes, and more particularly to a triple valve device.

The principal object of my invention is to provide means to facilitate the release movement of the triple valve device after the triple valve device has been operated to effect an application of the brakes.

Other objects and advantages will appear in the following more detailed description of the invention.

In the accompanying drawings; Fig. 1 is a view of a car fluid pressure brake equipment, showing the triple valve device in section, with the moving parts of the triple valve device in full release position, and embodying my invention; Fig. 2 a section on the line 2—2 of Fig. 1; Fig. 3 a plan view of the triple piston and slide valve assembly; Fig. 4 a section on the line 4—4 of Fig. 1; Fig. 5 a sectional view of the triple valve device showing the moving parts in service application position; Fig. 6 a sectional view of the triple valve device, showing the moving parts in service lap position; Fig. 7 a sectional view of the triple valve device, showing the moving parts after movement from service lap position upon an increase in brake pipe pressure; Fig. 8 is a sectional view of a triple valve device in full release position, showing a modified form of my invention embodied therein; and Fig. 9 a sectional view of the triple valve device shown in Fig. 8, with the moving parts in the position assumed upon initial movement from service lap position toward release position.

As shown in Fig. 1, the car fluid pressure brake equipment may comprise a triple valve device 1, a brake cylinder 2, and an auxiliary reservoir 3. The triple valve device comprises a casing having a piston chamber 4, connected to the usual brake pipe 5 and containing a piston 6, and having a valve chamber 7 connected to the auxiliary reservoir 3 and containing a main slide valve 8 and a graduating slide valve 9 adapted to be operated by piston 6. The triple valve casing also contains the usual emergency piston 10 for operating the usual emergency brake pipe vent valve 11.

The triple valve device is shown as of the retarded release type having a yielding stop member 12, subject to the pressure of a coil spring 13 for opposing the movement of the triple valve piston and slide valves from full to retarded release position.

According to my invention the stem through which the piston 6 operates the slide valves is made in two parts, comprising a central member 14, preferably rectangular in cross section, and integrally connected to the piston 6, through a cylindrical portion 15. The other part of the stem comprises a member 16 having a hollow cylindrical formed section 17 with a radial flange 28 at its open end, and a rearward section 18, rectangular in cross section and provided with a longitudinal slot 19 in which the central member 14 is guided.

The outer end portion 20 of the member 16 is not slotted, but is provided with a bore 21 adapted to receive a round end portion 22 carried by the central member 14. A flange or spider 23 is carried by the rearward section 18 of the member 16. The section 14 is provided with a centrally disposed, horizontal slot 24 adapted to receive a rivet 25, secured to the section 18. The section 18 is mounted between the wings 26 carried by the slide valve 8. A coil spring 27 is mounted within the cylindrical portion 17 of the member 16 between the piston 6 and the end wall of the portion 17.

In operation, assuming for the moment, that the brake pipe is charged with fluid under pressure as well as the auxiliary reservoir, and that the moving parts of the triple valve device are in full release position, as shown in Fig. 1, if it is desired to effect a service application of the brakes, the brake pipe pressure is gradually reduced in the usual manner.

The triple piston 6 is then moved out, causing the member 14 to move the member 16, through the rivet pin 25. The initial movement of the member 16 causes the movement of the graduating slide valve 9 relatively to the main slide valve 8, as permitted by the clearance provided between the spider 23 and the rear end of the slide valve 8. This movement of the graduating valve 9 uncovers service port 30 in the main slide valve 8. Upon engagement of the spider 23 with the end of the slide valve 8, said slide valve is shifted, so as to first cut off communication from brake cylinder passage 31, through cavity 32, to atmospheric exhaust port 33, and then cause the service port 30 to register with passage 31, the parts being now in the service application position, as shown in Fig. 5.

Fluid under pressure is then supplied from the auxiliary reservoir 3 to the brake cylinder to effect an application of the brakes. When the auxiliary reservoir pressure has been reduced by flow to the brake cylinder, to a degree slightly less than the reduced brake pipe pressure, the piston 6 is operated to shift the graduating valve 9 to lap position, as shown in Fig. 6, so that further flow of fluid to the brake cylinder is prevented.

In the service position of the main slide valve 8, a port 34, through the main slide valve, registers with an atmospheric port 35, but in both service and service lap positions, this port 34 is closed by the graduating valve 9.

When it is desired to effect the release of the brakes, the brake pipe pressure is increased in the usual manner. It will now be noted that movement of the piston 6 to the right from service lap position toward release position is opposed by the resistance of the spring 27, and the frictional resistance of the piston 6 and the graduating valve 9, so that when the brake pipe pressure has been increased above the auxiliary reservoir pressure a predetermined amount sufficient to overcome the resistance of the spring 27 and the frictional resistance of the piston 6 and the valve 9, the piston 6 will be moved to the right, so as to shift the graduating valve 9 to the position shown in Fig. 7. The required differential of pressures between the auxiliary reservoir and the brake pipe necessary to move the piston 6 depends upon the resistance value of the spring 27 and preferably the spring is such that the piston 6 will be moved when the brake pipe pressure has been increased to about one and one-half pounds above the auxiliary reservoir pressure.

In moving to the position shown in Fig. 7, the graduating valve 9 operates to uncover the port 34, so that fluid under pressure is now vented from the valve chamber 7 and the auxiliary reservoir 3 to the atmosphere, through port 35. The reduction in auxiliary reservoir pressure continues until the differential pressure between the auxiliary reservoir and the brake pipe is sufficient to permit the piston 6 to move the main slide valve 8.

It will be noted that with the parts in the position shown in Fig. 7, the piston 6 is in engagement with the flange 28 of the stem member 16, the relative movement between the stem members 14 and 16 from the positions shown in Fig. 6 to the positions shown in Fig. 7 being permitted by the movement of the rivet pin 25 in the slot 24.

The end wall of the portion 17 of the stem member 16 being in engagement with a shoulder of the main slide valve 8, movement of piston 6 toward the right from the Fig. 7 position causes movement of the main slide valve 8. Initial movement of the main slide valve in this direction causes the port 34 to be moved out of registry with the exhaust port 35, so that further venting of fluid from the auxiliary reservoir is prevented. Continued movement of the piston 6 and the main slide valve causes the cavity 32 to connect passage 31 with exhaust port 33, so that fluid is released from the brake cylinder. At the head end of the train, where the increase in brake pipe pressure is more rapid, the triple valve piston 6 will move to retarded release position, moving the retarded release stop member 12 against the resistance of spring 13. In this position, the brake cylinder passage 31 is connected to the exhaust port 33, through a restricted extension 36 of the cavity 32, so that the release of fluid from the brake cylinder is retarded in this position.

After the pressures in the auxiliary reservoir and the brake pipe have substantially equalized, the spring stop member 12 moves the stem section 16 and main slide valve 8 back to full release position, as shown in Fig. 1, and the spring 27 moves the piston 6 and the stem member 14 to the position relative to the stem member 16, as shown in Fig. 1.

In the release positions of the piston 6, the auxiliary reservoir is recharged from the brake pipe by way of the feed groove 37 around the triple valve piston 6.

It will now be seen that with my improvement, after a service application of the brakes, upon a light, but predetermined increase in brake pipe pressure, the triple valve devices throughout the train are positively moved to release position.

As a further aid to facilitating the release of the brakes I propose to provide means for temporarily separating the valve chamber of the triple valve device from the auxiliary reservoir while fluid is being vented from the valve chamber, so that the desired differential pressure on opposite sides of the triple valve piston may be obtained more quickly and without appreciable loss of auxiliary reservoir pressure.

For this purpose, as shown in Figs. 8 and 9, a valve, such as a flexible diaphragm 38 is provided for controlling communication from the auxiliary reservoir 3, through passage 39 to the valve chamber 7. The diaphragm 38 is subject to the pressure of a spring 40 contained in chamber 41 at one side of the diaphragm, which pressure urges the diaphragm into engagement with a seat rib 42.

The chamber 41 is connected to a passage 43, which leads to the special exhaust port 35', a restricted flow portion 44 being provided in passage 35' between passage 43 and the exhaust outlet. Normally, the chamber 41 being open to the atmosphere by way of passage 43 and exhaust passage 35', the auxiliary reservoir pressure acting on the upper face of the diaphragm 38, maintains the diaphragm 38 unseated from the seat rib 42, against the pressure of spring 40, as shown in Fig. 8, so that fluid under pressure is free to flow from the auxiliary reservoir 3, through passage 39 to the triple valve chamber 7 and also from the valve chamber 7 to the auxiliary reservoir. When, however, after a service application of the brakes, the triple valve piston 6 is shifted in releasing the brakes from service lap position, as shown in Fig. 8, to the venting position, as shown in Fig. 9, fluid under pressure which is vented from the valve chamber 7 through port 34 to passage 35', flows through passage 43 to chamber 41, as well as through passage 35' to the atmosphere. The fluid pressure thus supplied to chamber 41 plus the pressure of spring 40 is sufficient to overcome the pressure of the auxiliary reservoir acting on the upper face of the diaphragm 38, so that said diaphragm is moved into engagement with the seat rib 42, thus cutting off communication from the valve chamber 7 to the auxiliary reservoir 3. It will now be seen that fluid under pressure will only be vented from the valve chamber 7 in the Fig. 9 position, so that the pressure in the valve chamber will be more rapidly reduced and at the same time, appreciable loss of auxiliary reservoir pressure is prevented.

Except that fluid is only vented from the valve chamber 7, the operation in releasing the brakes with respect to the construction shown in Figs. 8 and 9 is the same as that of the construction shown in Figs. 1 to 6.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, and brake cylinder, of a triple valve device comprising a main valve, a graduating valve, and a piston subject to the opposing pressures of the brake pipe and a chamber and operated upon a gradual reduction in brake pipe pressure for actuating said valve to supply fluid from the auxiliary reservoir to the brake cylinder to effect a service application of the brakes, said piston being adapted to move the graduating valve relatively to the main valve to service lap position, in which the supply of fluid from the auxiliary reservoir to the brake cylinder is cut off, means permitting a further movement of the graduating valve by said piston relative to the main valve, in which further movement fluid is vented from said chamber, and a spring for preventing said further relative movement of the graduating valve by said piston until a predetermined differential in pressure between the brake pipe and said chamber has been created.

2. In a fluid pressure brake, the combination with a brake pipe, auxiliary reservoir, and brake cylinder, of a triple valve device comprising a main valve, a graduating valve, and a piston subject to the opposing pressures of the brake pipe and a chamber and for moving said valves upon a reduction in brake pipe pressure to service application position in which fluid under pressure is supplied from the auxiliary reservoir to the brake cylinder and then to service lap position in which the supply of fluid from the auxiliary reservoir to the brake cylinder is cut off, and means permitting a movement of the graduating valve relative to the main valve from service lap position by said piston upon an increase in brake pipe pressure to a position in which fluid is vented from said chamber.

3. In a fluid pressure brake, the combination with a brake pipe, auxiliary reservoir, and brake cylinder, of a triple valve device comprising a main valve, a graduating valve, and a piston subject to the opposing pressures of the brake pipe and a chamber and operated upon a reduction in brake pipe pressure for actuating said valves to effect an application of the brakes, said piston being operable after an application of the brakes upon an increase in brake pipe pressure to first move the graduating valve to vent fluid from said chamber and then the main valve toward release position, and a spring interposed between the main valve and the piston for preventing movement of the graduating valve by said piston to the position for venting fluid from said chamber until the brake pipe pressure has been increased to provide a predetermined differential in pressure between the brake pipe and said chamber.

4. In a fluid pressure brake, the combination with a brake pipe, of a triple valve device comprising a main valve, a graduating valve movable relatively to the main valve, a piston subject to brake pipe pressure, a stem carried by said piston for operating said graduating valve, a member having a movement relative to said main valve and operable by said stem for actuating said main valve, and a spring interposed between said member and said piston.

5. In a fluid pressure brake, the combination with a brake pipe, of a triple valve device comprising a main valve, a graduating valve movable relatively to the main valve, a piston subject to brake pipe pressure, a stem carried by said piston for operating said graduating valve, a member for operating said main valve having a movement relative to the main valve and a movement relative to said stem, and in which said stem is slidably mounted, said member being operatively connected to said stem.

6. In a fluid pressure brake, the combination with a brake pipe, of a triple valve device comprising a main valve, a graduating valve movable relatively to the main valve, a piston subject to brake pipe pressure, a stem carried by said piston for operating said graduating valve, a member for operating said main valve having a movement relative to the main valve, and in which said stem is slidably mounted, said member being operatively connected to said stem, and a spring interposed between said piston and said member.

7. In a fluid pressure brake, the combination with a brake pipe, an auxiliary reservoir, and a brake cylinder, of a triple valve device having a valve chamber normally open to the auxiliary reservoir and operated upon a reduction in brake pipe pressure for supplying fluid under pressure from said valve chamber and the auxiliary reservoir to the brake cylinder and upon an increase in brake pipe pressure after a reduction in brake pipe pressure for venting fluid from said valve chamber, and means operated upon venting fluid from said chamber for cutting off communication from said auxiliary reservoir to said chamber.

8. In a fluid pressure brake, the combination with a brake pipe, an auxiliary reservoir, and a brake cylinder, of a triple valve device comprising valve means contained in a valve chamber normally open to the auxiliary reservoir, a piston operated upon a reduction in brake pipe pressure for actuating said valve means to supply fluid under pressure from said valve chamber and auxiliary reservoir to the brake cylinder and operated upon an increase in brake pipe pressure to release the brakes to operate said valve means for venting fluid from said valve chamber, and means operated upon venting fluid from the auxiliary reservoir for cutting off communication from the auxiliary reservoir to said valve chamber.

9. In a fluid pressure brake, the combination with a brake pipe, an auxiliary reservoir, and a brake cylinder, of a triple valve device having a valve chamber normally open to the auxiliary reservoir and operated upon a reduction in brake pipe pressure for supplying fluid under pressure from said valve chamber and auxiliary reservoir to the brake cylinder and operated upon an increase in brake pipe pressure for first venting fluid from said valve chamber and then from the brake cylinder, and means operated by fluid vented from the valve chamber for cutting off communication from the auxiliary reservoir to said chamber.

CLYDE C. FARMER.